Patented Feb. 11, 1947

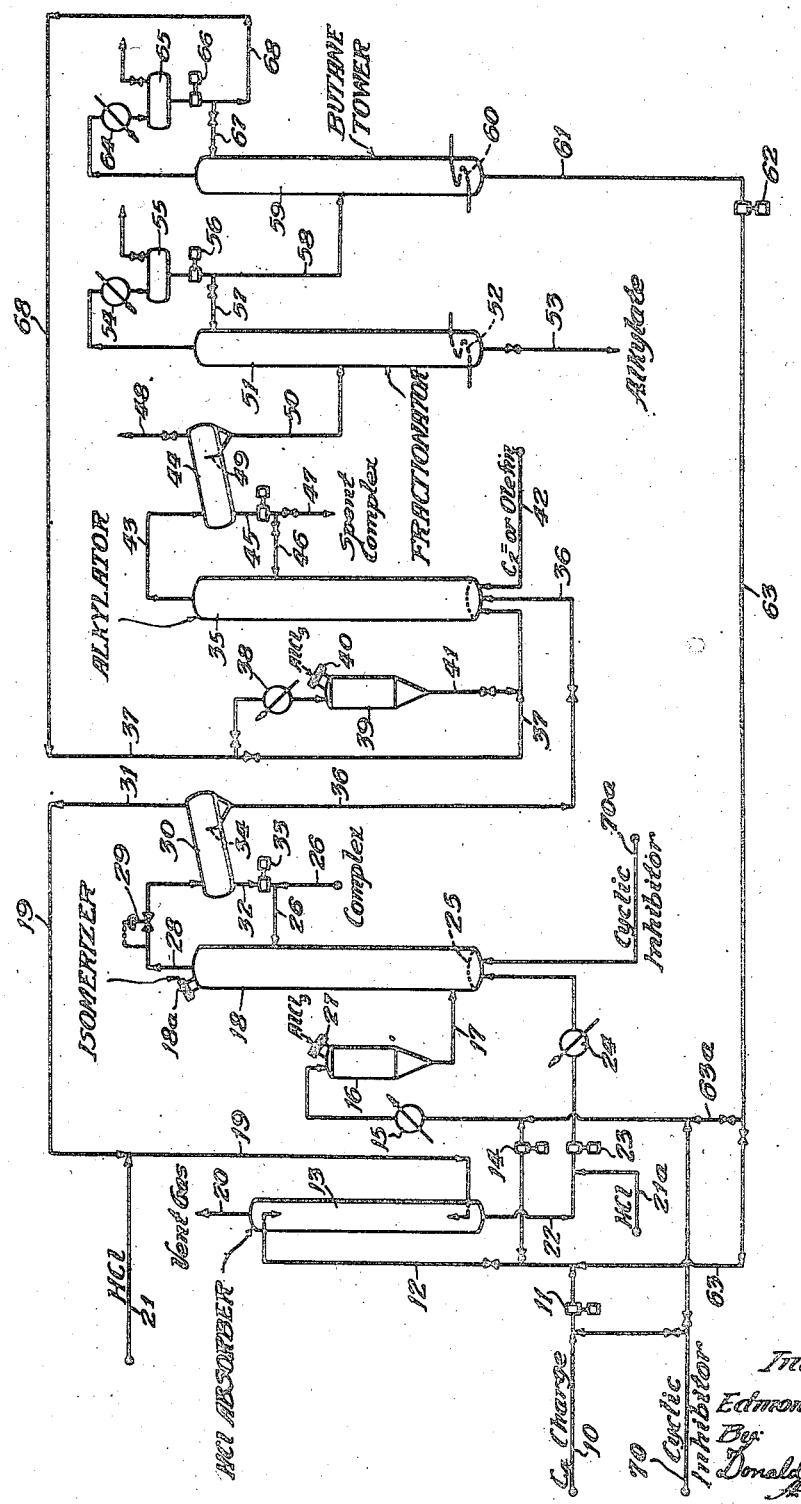

2,415,733

UNITED STATES PATENT OFFICE 2,415,733

UNITARY ISOMERIZATION-ALKYLATION SYSTEM

Edmond L. d'Ouville, Chicago, Ill., assignor to Standard Oil Company, Chicago, Ill., a corporation of Indiana Application May 29, 1943, Serial No. 488,964

2 Claims. (Cl. 260—683.4)

This invention relates to a unitary isomerization-alkylation system and it pertains more particularly to the isomerization of normal paraffins such as normal butane and subsequent alkylation of the resulting isoparaffin with an olefin such as ethylene by means of active metal halide catalysts for producing highly branched-chain paraffinic hydrocarbons such as diisopropyl which are valuable components of aviation fuel.

It is known that normal paraffins such as butane and pentane may be isomerized with catalysts of the active metal halide type, and it is known that the resulting isoparaffins may be alkylated with olefins with similar catalysts or catalysts such as sulfuric acid and many systems have heretofore been proposed for combining such processes. The object of my invention is to provide an improvement in systems of this general type which offers important commercial advantages over any such combination heretofore known to the art.

Aluminum chloride is quite soluble in light hydrocarbons such as butane and pentane particularly at temperatures upward of about 200° F. When such hydrocarbons are isomerized with catalysts consisting of or containing aluminum chloride at such temperatures there is therefore a marked tendency for the effluent product to contain dissolved aluminum chloride and for this dissolved aluminum chloride to be carried over with the reaction effluent stream to other parts of the system wherein it may cause considerable corrosion and operating difficulties and lead to high catalyst losses and large requirements of treating and neutralizing agents. In order to solve this aluminum chloride carry-over problem the art has resorted to many complicated and expensive expedients none of which is particularly desirable. When the isomerization is effected at high temperature with highly active catalyst this carry-over problem becomes even more pronounced and those skilled in the art have therefore used lower temperatures, less active catalysts, clay absorbers, materials which precipitate the catalyst by chemical combination therewith, antisolvents, etc. in an effort to minimize this carryover problem. An object of my invention is to provide a system in which the catalyst carry-over is not a detriment but a positive benefit and in which the isomerization may be effected at higher temperatures and with more active catalysts than have heretofore been commercially feasible whereby the isomerization reactor may be substantially reduced in size and the conversion per pass may be substantially increased.

The alkylation of isoparaffins with olefins by means of halide catalysts is taught by U. S. Patents 2,308,560–1–2. An object of my invention is to improve the alkylation processes of these patents and to integrate such processes with isomerization in such a manner that both steps may be operated with increased efficiency and the overall results may be remarkably and unexpectedly improved.

When aluminum chloride and hydrogen chloride are the make-up catalyst materials employed in the isomerization and alkylation steps, optimum isomerization is effected with relatively high hydrogen chloride concentrations, i. e., concentrations of the order of 3 to 10%, e. g. about 5 or 6% by weight based on charging stock. In the alkylation step the hydrogen chloride concentration should be much lower, i. e., should be below 4% or as low as 0.5% by weight based on aluminum chloride in the complex present or only a small fraction of a percent based on the charging stock. In the isomerization process catalyst consumption is relatively small and from 50 to 100 gallons of isomerization product may be produced per pound of added aluminum chloride; in the alkylation step, however, the catalyst requirement is much higher and usually only about 15 or 20 gallons of alkylate is produced per pound of aluminum chloride.

In practicing my invention I employ a more active catalyst in the isomerization step than has heretofore been commercially feasible. The activity of such catalyst material may be measured by its heat of hydrolysis which in turn can be determined by any well known calorimetric method wherein the temperature rise occasioned by the addition of one mol of complex to approximately 100 mols of water can be measured. I have discovered that the optimum aluminum halide-hydrocarbon complex catalyst for effecting isomerization are those which in the case of aluminum chloride complexes have heats of hydrolysis between the approximate limits of 68 and 75 large calories per gram atom of active aluminum, and in the case of aluminum bromide complexes between 75 and 82 large calories per gram atom of active aluminum. By maintaining the activity of the isomerization catalyst within these rather critical limits I obtain from 50 to 70% conversion per pass and I can obtain this conversion with a smaller reactor than has heretofore been deemed necessary. The expression "active aluminum" is used in this specification and in the accompanying claims refers to the aluminum content of the hydrolizable aluminum compounds in the aluminum halide-hydrocarbon complex; thus any aluminum in the form of oxide or hydroxide is not "active aluminum" since it is not hydrolizable.

To maintain the catalyst in the isomerization step at an activity of 68 to 75 large calories per gram atom of active aluminum in the case of aluminum chloride it is necessary that make-up aluminum chloride be added in larger quantities than are required for effecting the isomerization reaction and large amounts of this aluminum chloride are carried over in solution in the effluent isomerization product stream. Instead of endeavoring to neutralize or remove this carry-over aluminum chloride I utilize it in effecting a subsequent alkylation step. The entire effluent product stream however cannot be charged to the alkylation step because of its high hydrogen chloride content and in practicing my invention I reduce the pressure on the effluent product stream sufficient to release a substantial portion of the hydrogen chloride and to permit its separation and recycling back to the isomerization step. By controlling the pressure at which the hydrogen chloride is released I can retain the optimum amount of hydrogen chloride in the effluent stream for use in the alkylation step. Any light hydrocarbon gases such as methane which might tend to accumulate in the system may be separated from the recycled gas by absorbing the hydrogen chloride content thereof in a portion of the incoming charging stock and venting the unabsorbed gas.

A feature of my process is the maintenance of relatively high temperatures between the isomerization and alkylation steps. The isomerization effluent product stream may not only contain dissolved aluminum chloride but may also contain other dissolved or mechanically entrained catalyst material the bulk of which can be separated from the stream by settling, centrifuging, filtration or other well known means. If cooling is employed for precipitating aluminum chloride the precipitate is in such a finely divided condition that it is extremely difficult to separate. Adding to the complexity of the problem is the unusual type of supersaturation which is encountered. On cooling a saturated solution of aluminum chloride, precipitation is not rapid or complete even in a turbulent system and in the presence of solid aluminum chloride. Consequently systems provided with cool settlers encounter serious operating difficulties because of plugged lines down stream from said cool settlers. Extreme corrosion also has been observed down stream from cool settlers where such precipitation takes place. By keeping the effluent product stream at high temperature enroute to the alkylation step I may thus eliminate or at least substantially minimize vexatious line plugging problems and corrosion difficulties.

It has heretofore been proposed to transfer catalyst complex from an isomerization reactor to an alkylation reactor but such practice offers the disadvantage of introducing into the alkylation zone any objectionable metal salts or other impurities which may accumulate in the isomerization zone. These impurities tend to increase the tendency toward cracking. Such tendency toward cracking is not a problem in the isomerization step because of the high stability toward cracking exhibited by normal butane and by pentanes containing small amounts of cyclic cracking inhibitors. However, the highly sensitive hexanes and heptanes produced in the alkylation step might be deleteriously affected if such impurities were transferred from the isomerization step to the alkylation step. In my system impurities remain in the isomerizer and it is only the desired catalyst components which are transferred from the isomerizer to the alkylation step.

In the alkylation step the make-up aluminum chloride may be supplied by the carry-over catalyst from the isomerization step and if any additional make-up catalyst is required it may be supplied by by-passing a part of a recycled isoparaffin stream through an aluminum chloride solution tank. The blending of the recycled isoparaffin stream with the isomerization product stream gives a composition which not only contains exactly the right amount of aluminum chloride and hydrogen chloride but which is also at the right temperature for effecting olefin alkylation. The olefin is preferably ethylene (which cannot successfully be alkylated by isoparaffins in sulfuric acid systems) although other olefins may of course be used. The mol ratio of isoparaffins to olefins in the alkylation step should be at least 4:1 and preferably should be greater than 6:1.

Since the effluent product stream leaving the alkylation step is substantially free from olefins any light gases and hydrogen chloride separated therefrom may be returned to the hydrogen chloride absorption step preceding the isomerization. The alkylate is then separated from the lower boiling paraffins and the paraffins are fractionated to give an isoparaffin recycle stream for the alkylation step and a normal paraffin recycle stream for the isomerization step.

An important feature of my invention is the use of cyclic hydrocarbon cracking inhibitors such as naphthenes in both the isomerization and alkylation steps. Thus benzene, alkyl benzenes, cyclo pentane, methyl cyclopentanes, cyclohexanes, methyl cyclohexanes or the like may be added in small amounts to the charging stock entering the isomerization step and by using such inhibitors I may employ even more severe reaction conditions and more highly active catalysts without causing an undue amount of cracking. In accordance with my invention such cracking inhibitors are carried with the effluent product stream from the isomerization step to the alkylation step and in the alkylation step to again serve as a cracking inhibitor and again to permit the use of more active catalysts and more severe operating conditions than would otherwise be possible.

The invention will be more clearly understood from the following detailed description read in conjunction with the accompanying drawing which forms a part of this specification and which is a schematic flow diagram of my improved isomerization-alkylation system.

As a specific example of my invention I will describe the production of diisopropyl from butane and ethylene by means of an aluminum chloride-hydrocarbon complex promoted by hydrogen chloride. A substantially olefin-free butane stream is introduced from source 10 by pump 11, about 50 to 80% of its being introduced by line 12 to the upper part of hydrogen chloride absorber 13 and the remaining 20 to 50% being introduced by pump 14 through heater 15 to aluminum chloride solution tank 16 and line 17 into reactor 18.

Absorber 13 may be operated at a pressure of approximately 300 pounds per square inch and at approximately atmospheric temperature so that hydrogen chloride from gases introduced by line 19 may be absorbed in the liquid butane while methane and other unabsorbed gases may be vented from the top of the absorber through line 20. Make-up hydrogen chloride may be introduced through line 21 to line 19 or through line 21a to line 22 which leads from the bottom of absorber 13. The hydrogen chloride solution is then introduced by pump 23 through heater 24 into the base of reactor 18, preferably through a suitable distributor 25.

Reactor 18 is preferably a tower about 25 to 50 feet in height and before starting up this reaction I introduce into the tower through line 26 a preformed aluminum chloride hydrocarbon complex which may, for example, be prepared as described in U. S. Patent 2,300,249 although the complex may be prepared from any saturated hydrocarbon which is substantially free from olefins and relatively free from aromatics. I may form the catalyst complex in situ by charging the reactor with solid lump aluminum chloride and contacting it with a normally liquid predominantly aliphatic hydrocarbon and hydrogen chloride. Such solid aluminum chloride can be introduced at 18a. The tower may be about one-half to three-fourths full of this complex material and I preferably employ a catalyst column in the complex which is about 20 to 30 feet or more in height.

The reactor is operated under a pressure sufficient to maintain liquid phase conversion conditions, i. e., under a pressure of about 400 to 800, for example, about 600 pounds per square inch. The tower is preferably operated at a temperature within the approximate range of about 200 to 250° F. although lower temperatures may be employed with the consequent lowering of reaction rate and higher temperatures may be employed particularly when a cracking inhibitor is used as will hereinafter be described. In this particular example, the tower is operated at a temperature of about 212° F.

Make-up aluminum chloride is added to the column in butane solution through line 17, the solution tank 16 being replenished with lump aluminum chloride from time to time through opening 27. The amount of make-up aluminum chloride thus introduced may be readily controlled by controlling the temperature and amount of butane which is passed through solution tank 16, a sufficient time being allowed for complete saturation in this solution tank. Frequently normal butane is not available in the high state of purity desired. Minute traces of olefins and sulfur impurities tend to coat over the aluminum chloride in solution tank 16. In this situation aluminum chloride may be introduced to the isomerizer 18 by passing recycle butane from butane tower 59 by lines 63 and 63a to contact tower 16. This butane having been previously contacted with the catalyst has been freed from such impurities. The solubility of aluminum chloride in butane is approximately as follows:

| Temperature | Weight per cent of AlCl₃ dissolved | Pounds of AlCl₃ per barrel of butane |
| --- | --- | --- |
| 100° F | .01 | .02 |
| 150° F | .3 | .6 |
| 200° F | 1.5 | 3.1 |
| 212° F | 2.1 | 4.3 |
| 250° F | 5.5 | 11.3 |

I add make-up aluminum chloride to tower 16 at a rate of about 1 to 4, e. g. about 2 pounds per barrel of total butanes charged to reactor 18. Thus when relatively small amounts of butane are introduced through line 17 such butane will be heated to higher temperatures in heater 15 than when larger amounts are so introduced, the necessary amounts and temperatures being readily ascertainable by those skilled in the art from the above solution table. The hydrogen chloride is introduced at the rate of about 5 to 20, for example, about 10 pounds per barrel of total stock charged to reactor 18. Make-up catalyst should be added at such a rate as to maintain the activity of the catalyst in reactor 18 between 68 and 75 large calories per gram atom of active aluminum in the complex.

The space velocity in isomerization reactor 18 is preferably within the approximate range of 0.4 to 4, e. g. about 1 volume of butane per hour per volume of complex. The upwardly flowing butane stream is intimately dispersed in the complex so that separate phases can hardly be discerned but liquid reaction products separate out from the upper surface of the column of complex and pass through line 28 and pressure reducing valve 29 to settler 30 which may be operated at approximately 300 pounds per square inch but slightly higher than the pressure of absorber 13 and at an elevated temperature preferably about 200 to 250° F. Most of the hydrogen chloride together with undissolved gases such as methane are taken overhead through line 31 and returned through line 19 to absorber 13. Any entrained catalyst which settles out in settler 30 is returned by line 32, pump 33 and line 26 to reactor 18. The remaining effluent product stream which may contain about .1 to 4 pounds of dissolved aluminum chloride per barrel passes over weir 34 and is withdrawn to alkylation reactor 35 through line 36 which is preferably heavily insulated or even steam jacketed to prevent the precipitation of aluminum chloride. A recycle isobutane stream is introduced from line 37 into reactor 35 at the point of discharge of line 36. For each volume of liquid introduced through line 36 I may introduce at least 4 or 5 volumes of recycled isobutane through line 37. Since the recycled isobutane may be at a temperature of about 80° F. and the temperature on stream in line 36 may be about 200° F., the temperature of the mixed stream entering reactor 35 may be at approximately 100° F. which is ideal for effecting the alkylation reaction. This entering stream will likewise contain desired make-up aluminum chloride and hydrogen chloride for effecting the alkylation reaction. The activity of the catalyst in reactor 35 should be maintained within the approximate range of 60 to 75 large calories per gram atom of active aluminum and if the carry-over catalyst from the product stream in line 36 is not sufficient to maintain such activity I may by-pass a part of the recycled isobutane stream through heater 38 and solution tank 39 for picking up any additional amount of make-up that may be required; the lump aluminum chloride supply in solution tank 39 being replaced from time to time through opening 40. The solution is preferably introduced to reactor 35 through line 41 but it may be introduced into line 36 for preliminary mixing.

Ethylene or other olefin is introduced into reactor 35 from line 42 at such a rate that the mol ratio of isobutane to olefin will be greater than 4:1 and preferably greater than 6:1. The alkylation may be effected at a temperature within the approximate range of 80 to 150° F., e. g. about 100° F. although higher temperatures may be employed if cyclic cracking inhibitors are used. The pressure should be sufficient to maintain liquid phase conditions and may be of the order of about 50 to 300, e. g. about 150 pounds per square inch. The space velocity may be approximately the same as in the isomerization step, i. e. about 0.4 to 4 volumes of liquid charge per hour per volume of complex in the reactor. With relatively high isoparaffin to olefin ratios however the space velocities may be increased to as much as 5 or 10 v./hr./v.

If it is desired to produce diisopropyl the catalyst activity should be in the general vicinity of about 65 to 70 large calories per gram atom of active aluminum. Usually this will mean that the complex contains roughly about 23 to 33% of bound hydrocarbons. Thus a catalyst activity of about 67 large calories per gram atom of aluminum may produce chiefly diisopropyl while a catalyst activity of about 75 large calories per gram atom of active aluminum may produce a product in which the diisopropyl content is less than the combined production of methyl pentane and neohexane.

The effluent product stream leaves the top of reactor 35 through line 43 to settler 44 from which any entrained complex may be settled out and returned to reactor 37 by lines 45 and 46. There may be a small amount of complex formed in the isomerization system and any additional complex in this system transferred along with the effluent product stream through line 36 to alkylation reactor 35. Likewise the bulk of complex in reactor 35 may tend to increase during the conversion. Any net production of complex may be continuously or intermittently withdrawn from the system through line 47 for the recovery of valuable components or for other utilization.

Gases may be vented from the top of settler 44 through line 48 and such gases may if desired be compressed and returned to line 19. The liquid alkylation product stream passes over weir 49 and is withdrawn through line 50 to fractionator 51 which is provided with a suitable heater or reboiler 52 at its base. Alkylate is withdrawn from the fractionator through line 53 and may be neutralized, water-washed and further fractionated for obtaining relatively pure diisopropyl or any other desired product fractions. The overhead from fractionator 51 (butanes and lighter) pass through cooler 54 to receiver 55. A portion of the accumulated liquid from receiver 55 is returned by pump 56 and line 57 to serve as reflux in fractionator 51. The remainder of this liquid is introduced through line 58 to butane tower 59 which is likewise provided with a suitable reboiler or heater 60 at its base. Normal butane is withdrawn through line 61 and returned by pump 62 and line 63 either to line 12 leading to absorber 13 or to solution tank 16 and line 17 as hereinabove described. It will be understood that if the recycled stream is introduced in the absorber a suitable cooler will be employed.

The overhead isobutane stream from tower 59 passes through cooler 64 to receiver 65. A part of the accumulated liquid is returned by pump 66 and line 67 to serve as reflux in the top of tower 59 and the remainder is returned through line 68 to line 37 for introduction into alkylation reactor 35. Any uncondensed gases may be vented from the top of accumulator 65 or introduced into line 68 or line 19.

As another specific example of my invention I may employ a pentane charging stock to which has been added a small amount of a cracking inhibitor. It has been found that by adding about .02 to 3% or preferably .1 to 1% of an aromatic such as benzol or about .2 to 20, preferably about 1 to 10% by volume of a naphthene such as cyclopentane, methyl cyclopentane, cyclohexane, etc. cracking may be substantially inhibited and a relatively long catalyst life may be obtained. The inhibitor may be added to the charging stock through line 70 or directly to the reactor through line 70a. In the case of aromatics, the inhibitor should not be chemically combined with the complex because aromatic complexes do not inhibit cracking. Generally speaking, the conversion conditions in the case of pentane may be approximately the same as hereinabove described for the case of butane except that somewhat lower pressures may be employed for maintaining liquid phase reaction conditions. The solubility of aluminum chloride in pentane is as follows:

| Temperature | Weight per cent of AlCl₃ in pentane | Pounds of dissolved AlCl₃ per bbl. pentane |
|---|---|---|
| 100° F | .01 | .02 |
| 150° F | .1 | .2 |
| 220° F | .9 | 2.0 |
| 212° F | 1.5 | 3.3 |
| 250° F | 4.3 | 9.4 |

In the case of pentane it has been noted that the amount of dissolved aluminum chloride is dependent upon whether or not the final solution temperature is approached from the low temperature side or the high temperature side of the solution temperature. The above table represents the solubilities when the solution temperature is approached from the low temperature side. When a mixture of pentane and aluminum chloride is heated to a higher temperature and then cooled to the desired solution temperature allowing as much as a half-hour for equilibrium to be reached it has been found that considerably more aluminum chloride can be dissolved as is indicated by the following table:

| Temperature | Weight per cent of AlCl₃ in pentane | Pounds of dissolved AlCl₃ per bbl. pentane |
|---|---|---|
| 100° F | .01 | .02 |
| 150° F | .3 | .7 |
| 200° F | 2.3 | 5.1 |
| 212° F | 3.1 | 6.8 |
| 250° F | 7.1 | 15.6 |

Thus particularly in the case of pentanes when it is desired to dissolve large amounts of aluminum chloride it may be desirable to effect the solution at a relatively high temperature and then cool the resulting solution to the extent necessary before introducing it through line 17 to reactor 18 or before returning it from solution tank 39 and line 41 to reactor 35.

When a cracking inhibitor is employed in the isomerization step this inhibitor is carried along with the effluent stream and introduced into the alkylation step wherein it likewise acts as an inhibitor and hence enables the use of higher temperatures or more severe operating conditions than would otherwise be feasible. When aromatics are employed there may be a certain amount of aromatic alkylation but the resulting alkylate likewise functions as an inhibitor and may be a desired product. Naphthenes will have the advantage of being unreactive in the alkylation step. The naphthenes or aromatics employed as inhibitors in the alkylation and isomerization steps may be selected so that they may be readily separated from the desired alkylation product (such as diisopropyl). Where the alkylation product is to be employed as an aviation motor fuel the inhibitor may be left in the product as a component of said fuel, particularly when said inhibitor is cyclopentane, methyl or polymethyl cyclopentane or a hydroaromatic which is characterized by good antiknock properties particularly under rich mixture or supercharge conditions.

Advantageous results may also be obtained by employing the cyclic hydrocarbon inhibitor in the butane isomerization and alkylation steps; the stated critically small amount of aromatics and naphthenes may enable the use of temperatures of about 25 to 50 degrees higher than would otherwise be permissible so that any given installation would have a considerably increase throughput because of the increase in conversion effected by the more severe operating conditions made possible by the use of inhibitor.

While I have described the use of aluminum chloride and aluminum chloride-hydrocarbon complexes as my catalyst in the above examples it should be understood that the invention is not limited to such catalyst but is applicable generally to active metal halide catalysts. In the case of aluminum bromide the activity of the isomerization catalyst should be within the approximate range of 75 to 82 large calories per gram atom of active aluminum. My invention is also applicable to systems wherein the isomerization is effected by an active metal halide dissolved in an inert non-hydrocarbon liquid such as antimony trichloride because here again there is a pronounced tendency for the effluent product stream to carry over dissolved aluminum chloride and in accordance with my invention this carryover is not a detriment but is a positive benefit.

While I have described in detail specific examples of my invention it should be understood that the invention is not limited to the particular system nor to any of the particular operating conditions set forth in these examples since numerous modifications and alternative operating conditions will be apparent from the above description to those skilled in the art.

I claim:

1. The method of synthesizing hydrocarbons which method comprises isomerizing a normal paraffin hydrocarbon having at least four but less than six carbon atoms per molecule by contacting said paraffin hydrocarbon with an active metal halide isomerization catalyst and a substantial amount of a hydrogen halide activator in a first contacting zone under such conditions that substantial amounts of the active metal halide and hydrogen halide are carried away from the first contacting zone with isomerized hydrocarbons in the effluent product stream leaving said first contacting zone, maintaining said effluent product stream at a high temperature which is not substantially lower than the temperature maintained in said first contacting zone while conveying said stream from said first contacting zone to a second contacting zone, removing most of the hydrogen halide from said stream before said stream enters said second contacting zone, recycling said removed hydrogen halide to said first contacting zone, introducing into said second contacting zone an olefin hydrocarbon and a relatively large stream of recycled hydrocarbons hereinafter defined, passing the combined streams containing said olefin hydrocarbon and isomerized paraffin hydrocarbons through said second contacting zone in contact with an active metal halide alkylation catalyst under alkylation conditions, employing an alkylation catalyst which requires make-up active metal halide in amounts at least equal to the amount of active metal halide dissolved in said effluent product stream, effecting alkylation of said olefin with said isomerized paraffin hydrocarbon by means of said alkylation catalyst which is thus fortified with active metal halide from the isomerization product stream and activated by the small amount of halogen halide which is left therein, fractionating the hydrocarbons discharged from the second contacting zone to obtain an alkylate fraction and at least one other fraction consisting chiefly of isomerized paraffin hydrocarbons, cooling said last-named fraction to a temperature sufficiently low to cool the effluent product stream to alkylation temperature when combined therewith, and returning said cooled stream to said second contacting zone as said relatively large stream of recycled hydrocarbons.

2. The method of claim 1 wherein the normal paraffin hydrocarbon undergoing isomerization is normal butane, wherein the olefin is ethylene, wherein the catalyst in the first contacting zone is an aluminum chloride-hydrocarbon complex having an activity in the range of about 68 to 75 large calories per gram atom of active aluminum and wherein the catalyst in the second contacting zone is an aluminum chloride-hydrocarbon complex having an activity in the approximate range of 65 to 70 large calories per gram atom of active aluminum.

EDMOND L. D'OUVILLE.

REFERENCES CITED

The following references are of record in the file of this patent:

UNITED STATES PATENTS

| Number | Name | Date |
|---|---|---|
| 2,316,775 | Egloff | Apr. 20, 1943 |
| 2,308,561 | Marschner et al. | Jan. 19, 1943 |
| 2,308,560 | Carmody et al. | Jan. 19, 1943 |
| 2,301,615 | Chenicek et al. | Nov. 10, 1942 |
| 2,330,206 | Dryer et al. | Sept. 28, 1943 |
| 2,332,577 | Kassel | Oct. 26, 1943 |
| 2,342,922 | Danforth | Feb. 29, 1944 |
| 3,342,123 | Danforth | Feb. 22, 1944 |